(No Model.) 2 Sheets—Sheet 1.
W. KOEDDING.
ELECTRIC MOTOR OR GENERATOR.
No. 495,941. Patented Apr. 18, 1893.
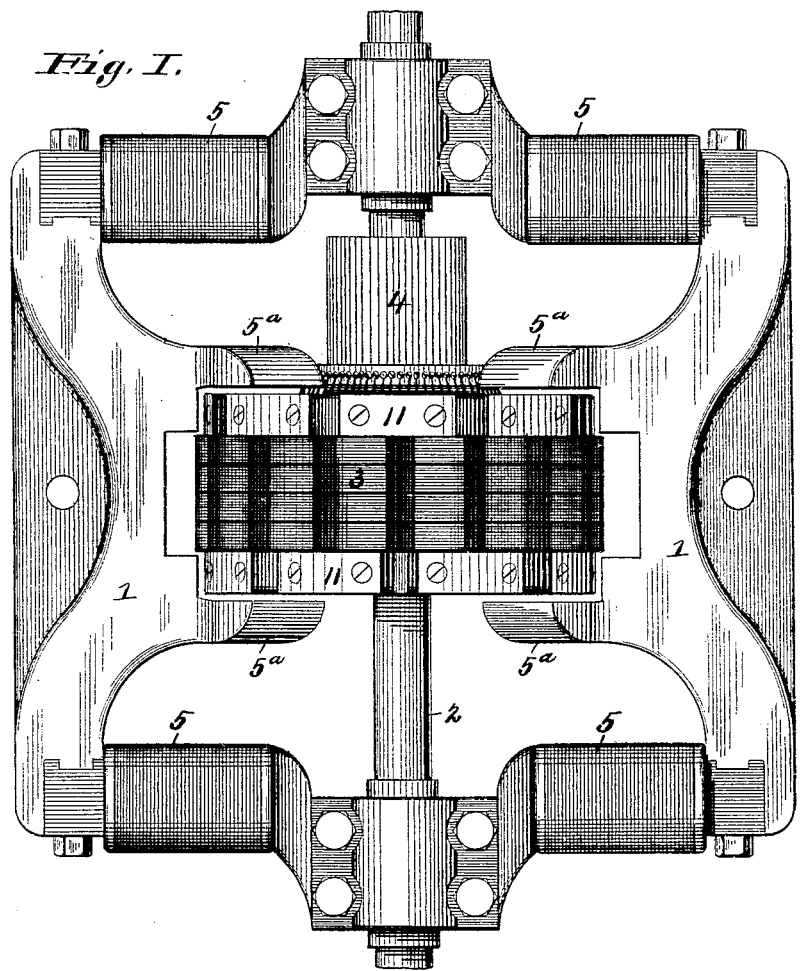
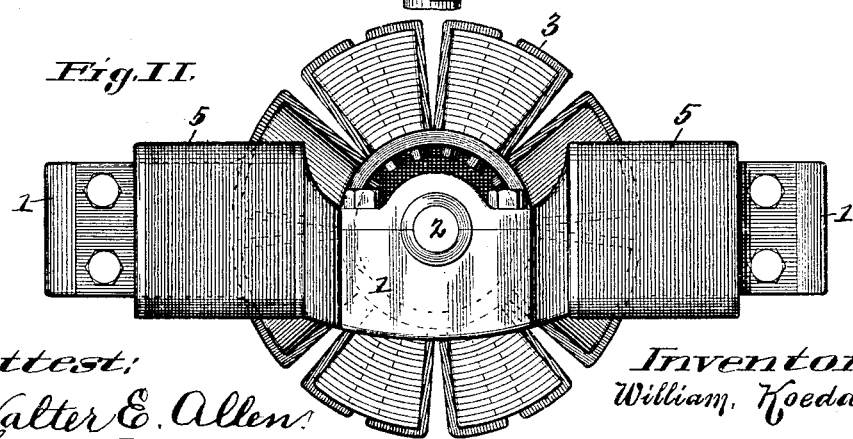
Attest:
Walter E. Allen
George E. Cruse
Inventor,
William Koedding.
By Knight Bro's.
att'ys.
THE NORRIS PETERS CO., PHOTO-LITHO., WASHINGTON, D. C.

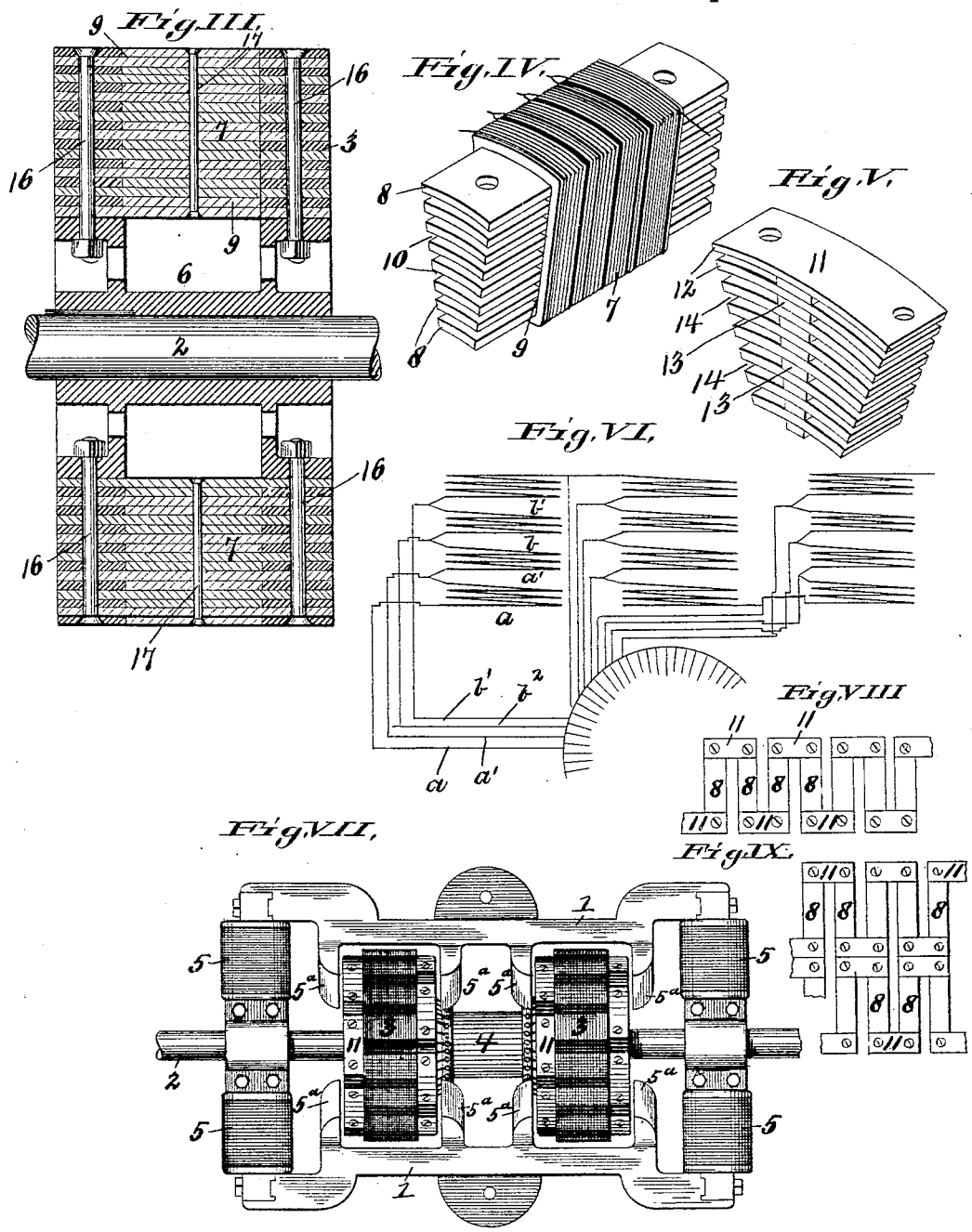

UNITED STATES PATENT OFFICE.

WILLIAM KOEDDING, OF ST. LOUIS, MISSOURI, ASSIGNOR OF ONE-HALF TO EDMOND VERSTRAETE, OF SAME PLACE.

ELECTRIC MOTOR OR GENERATOR.

SPECIFICATION forming part of Letters Patent No. 495,941, dated April 18, 1893.

Application filed September 21, 1891. Serial No. 406,369. (No model.)

*To all whom it may concern:*

Be it known that I, WILLIAM KOEDDING, a citizen of the United States, and a resident of the city of St. Louis, State of Missouri, have invented certain new and useful Improvements in Electric Motors and Generators, of which the following is a specification.

The invention in this machine lies chiefly in the construction of the armature, and the arrangement of the field magnets. The peculiarity about this armature is that it has a long magnetic circuit, a great number of turns of wire to produce a counter electro-motive force, a powerful torque as the result of these combinations, and that in case of injury to one part, it can, in a very short time, be replaced by another one kept on hand. My arrangement also permits the use of a commutator of a great many segments, thus preventing sparking at the brushes. The field magnets and the poles thereof are so constructed that they act on the periphery, as well as on the sides of the armature.

An important object of my invention is to produce a long magnetic circuit, and a much longer one than could be obtained with a Gramme ring or drum armature of the same diameter, and to this end I have arranged the iron in my armature so that the lines of force travel in zigzag direction to and fro across the armature, or in a laterally winding direction, producing just the same as in a Gramme ring, poles, diametrically opposite each other.

I have shown in the illustrations only a two pole machine, but it is obvious that the construction of the armature allows the employment of a greater number of poles. I have also only shown, in full, the arrangement of an armature with a single magnetic zigzag circuit; but in a diagram I show an armature with a double magnetic circuit.

Figure I is a top view of the machine; Fig. II an end view of the same. Fig. III is a longitudinal section of the armature. Fig. IV is a perspective view of a section of the armature. Fig. V is a perspective view of one of the end pieces of the armature which connects the wound parts in such a manner that the lines of force travel in a zigzag direction to and fro across the armature from one pole or poles of the field to the other. Fig. VI is a diagram, showing the connections of the armature wires to the commutator. Fig. VII shows an arrangement of two armatures in a magnetic field, the commutator being placed between the two armatures. Fig. VIII is a diagram of the magnetic circuit. Fig. IX is a diagram of the magnetic circuit of two armatures in which two faces are joined.

Referring to the drawings, 1 represents a frame in which the shaft 2, that carries the armatures 3, is journaled.

4 represents the commutator.

5 represents the field magnets located, one in each of the four corners of the frame 1.

$5^a$ represents the pole pieces, which I have shown formed integral with the frame 1, and which embrace the sides, as well as the periphery of the armature, as shown plainly in Figs. I and VII.

Each armature has a central, non-magnetic hub 6, to which is connected a series of sections 7, one of which is shown in Fig. IV. Each section 7 is composed of a number of plates 8, held a distance apart by a number of shorter plates 9, which do not extend to the ends of the plates 8, leaving spaces 10 between the plates 8 at the ends of the sections 7. The sections 7 are connected, alternately at opposite ends, see Figs. VIII and IX, by sections 11, see Fig. V, composed of plates 12 interposed by short plates 13 which hold the plates 12 a distance apart, forming openings 14 at the ends of the sections 11. When the parts are put together the spaces 10 of the sections 7 receive the ends of the plates 12 of the sections 11, and the spaces 14 of the sections 11 receive the ends of the plates 8 of the sections 7, see Fig. III, and the whole is connected by bolts 16 to the hub 6. The plates of the sections 7 (and the sections 11 also, if desired) may be connected by bolts 17. A single armature may be used, as shown in Figs. I and VIII, or a double armature, as shown in Figs. VII and IX. The sections 7 are wound between the connecting end sections 11, $a$, $a'$ and $b$, $b'$ representing corresponding wires from the commutator to the armature and back to the commutator again.

The arrangement of the different parts of the armature is such that the magnetism in the armature in a two pole field is concentrated at two points diametrically opposite to each other.

The magnet bars and connections are shown as being built up of strips of iron, but I can make many other forms which serve for the same end, to make in a two pole machine two long magnetic circuits running in zigzag across the armature, and forming double poles at diametrically opposite points.

Fig. IX shows the diagram of a magnetic circuit consisting of a double zigzag. With this form of armature a field may be used which would not only attract the armature from the sides; but also on the periphery.

The pole pieces 5ª embrace the armature in such a manner, as stated, that the attraction or action of the same is from the sides as well as from the periphery.

What I claim as my invention is—

1. In an electric motor or generator, the combination of the field-magnets, a commutator, and an armature made up of two or more cores having their adjacent ends connected alternately at front and back to form a continuous zigzag magnetic circuit, each core being wound with two or more coils connected in series and also connected individually with different bars of the commutator so that the polarity is alternated in adjacent poles and is reversed in all the poles gradually, as described.

2. In an electric motor or generator, the combination of two armatures, each having a zigzag magnetic circuit formed with transverse bars, said bars being wound in two or more coils; with one commutator between the armatures, said coils being connected with different bars of the commutator, substantially as described.

3. In an electric motor, an armature composed of wound sections 7 connected alternately at the ends by sections 11 each of said sections being built up of layers of plates, substantially as shown and described.

4. In an electric motor, an armature composed of built up transverse sections 7, consisting of plates 8 and short plates 9, and built up sections 11 consisting of plates 12 and short plates 13, the sections 7 being joined by the sections 11, substantially as set forth.

WM. KOEDDING.

In presence of—
E. S. KNIGHT,
A. M. EBERSOLE.